United States Patent [19]

Perine et al.

[11] Patent Number: 4,974,254
[45] Date of Patent: Nov. 27, 1990

[54] INTERACTIVE DATA RETRIEVAL SYSTEM FOR PRODUCING FACSIMILE REPORTS

[76] Inventors: Michael C. Perine, 101 Ocean Lane Dr., Ste. 4011; Gregory C. Han, 685 Curtiswood Dr., both of Key Biscayne, Fla. 33149

[21] Appl. No.: 349,854

[22] Filed: May 10, 1989

[51] Int. Cl.⁵ .................... H04M 11/00; H04N 1/32
[52] U.S. Cl. ................................. 379/100; 379/90; 379/96; 364/900; 358/403; 358/435; 358/443; 358/442
[58] Field of Search .......... 358/400, 402, 403, 405, 358/407, 434, 435, 436, 438, 443, 442; 379/90, 91, 96-98, 100

[56] References Cited

U.S. PATENT DOCUMENTS

| 4,340,783 | 7/1982 | Sugiyama et al. | 379/98 |
| 4,489,438 | 12/1984 | Hughes | 379/88 |
| 4,554,418 | 11/1985 | Toy | 379/97 |
| 4,645,873 | 2/1987 | Chomet | 379/96 |

FOREIGN PATENT DOCUMENTS

| 0018321 | 2/1978 | Japan | 358/400 |
| 0001653 | 1/1981 | Japan | 358/434 |
| 0152072 | 9/1982 | Japan | 379/100 |
| 0043240 | 2/1987 | Japan | 379/100 |
| 0296548 | 12/1988 | Japan | 379/94 |
| 84/00072 | 1/1984 | PCT Int'l Appl. | 379/98 |
| 2211698 | 7/1989 | United Kingdom | 379/98 |

OTHER PUBLICATIONS

"Dialog/4X Multi-Line Voice Communication Systems User's Guide" (Excerpts), ©1988, Dialogic Corporation.
"Gamma Fax User Manual" (Excerpts), Gamma Technology Inc., Apr. 1988.
Anonymous, "Document Distribution System", International Technology Disclosures, May 25, 1988, p. 2.
R. J. Perdue et al., "Conversant® Voice System: Architecture and Applications", AT&T Technical Journal, pp. 34–47, Sep./Oct. 1986, vol. 65, No. 5, (379–388).
Y. Ozawa et al., "Voice Response System and Its Applications", Hitachi Review, vol. 28, No. 6, Dec. 1979, pp. 301 ∝ 305, (379–397).

Primary Examiner—Jin F. Ng
Assistant Examiner—Wing F. Chan
Attorney, Agent, or Firm—Robert C. Kain, Jr.

[57] ABSTRACT

The interactive data retrieval system utilizes a computer system that has a telephone interface, a memory, and a facsimile transmission device. The telephone interface is connected to a telephone line and receives information request signals from the caller and transmits audio responses over the telephone line to that person based upon the requested signals. The computer program converts the information request signals into a search request command. The program searches the data compilation and obtains a data set based upon that command. The data set may be an acknowledgment of the subscriber or customer account number and security code or, on a broader level, may be the number of hits or records present in the data set that was generated by the search of the data compilation. The program produces signals which represent audio response signals and the audio response signals are sent via the telephone interface to the subscriber or customer. The audio response signals are based upon a characteristic of the data set. The subscriber then sends a search order command. The program responds by compiling and formatting records corresponding to the data set facsimile signals and sends the facsimile signals over the fax to another machine.

32 Claims, 9 Drawing Sheets

INTERACTIVE DATA RETRIEVAL SYSTEM FOR PRODUCING FACSIMILE REPORTS

BACKGROUND OF THE INVENTION

The present invention relates to an interactive data retrieval system which enables the user or subscriber to interactively formulate a search request via a dual tone multifrequency telephone and, subsequent thereto, the system produces a facsimile report that is sent to the subscriber or to a designated location over the telephone lines. The invention can be configured as a purchasing system.

With the advent of low cost facsimile or fax machines and the wide use of those machines, there exists an opportunity to utilize the fax machines to the benefit of subscribers, customers and users.

OBJECTS OF THE INVENTION

It is an object of the present invention to provide an interactive data retrieval system that is user friendly.

It is another object of the present invention to provide an interactive data retrieval system that assists the subscriber, customer or user in identifying certain needed information and, thereafter, generates and sends a report formatted as a facsimile transmission to the fax machine of the subscriber or customer.

It is another object of the present invention to provide an interactive data retrieval system for subscribers seeking information about individuals seeking employment.

It is a further object of the present invention to provide an interactive data retrieval system that additionally monitors financial data on a real time basis and provides financial reports to subscribers upon request via the subscribers' facsimile machines.

It is another object of the present invention to provide an interactive data retrieval and purchasing system that permits a customer to order goods or services via a TOUCH TONE TM telephone, have the system audibly confirm the order and subsequently have the system confirm the order in writing by transmitting a facsimile invoice or order confirmation to the customer's facsimile machine.

SUMMARY OF THE INVENTION

The interactive data retrieval system utilizes a computer system that has a telephone interface, a memory, and a facsimile transmission device. The telephone interface is connected to a telephone line and receives information request signals from the caller, who is a subscriber, customer or user, and transmits audio responses over the telephone line to that person based upon the requested signals. The memory contains a data compilation of records that customarily includes information regarding the subscriber, customer or user, security or identification codes, and data records that contain information useful to that person. In one embodiment, the data records relate to people seeking employment. In another embodiment, the data records include financial information that is obtained, on a real time basis, from a telecommunications board which monitors that information. The financial information includes prices of stocks, bonds, etc. In a third embodiment, the data compilation includes records regarding goods that may be purchased by the customer.

The computer program converts the information request signals received from the subscriber or customer over the telephone interface into a search request command. The program searches the data compilation and obtains a data set based upon that command. The data set may be an acknowledgment of the subscriber or customer account number and security code or, on a broader level, may be the number of hits or records present in the data set that was generated by the search of the data compilation. The program produces signals which represent audio response signals and the audio response signals are converted by the telephone interface into audio responses and sent to the subscriber or customer. The audio response signals are based upon a characteristic of the data set. This characteristic may be a confirmation of the account number or security code, the number of records in the data set or other characteristics of the data set resulting from the search of the data compilation. The subscriber or customer sends a search command or order command over the telephone lines to the telephone interface. The program responds to these commands by compiling and formatting records corresponding to the data set. The records are formatted and represented by facsimile signals and are sent, via the facsimile transmission device, to a facsimile machine that is unique to the subscriber, customer or user. In one embodiment, the facsimile report may be a listing of all individuals seeking employment, their addresses, phone numbers and backgrounds. In another embodiment, the facsimile formatted signals represent a financial report compiled from the most recently obtained financial data under study by the subscriber. In a third embodiment, the facsimile report may be an invoice to the customer for the goods ordered via the system or may be an order confirmation.

BRIEF DESCRIPTION OF THE DRAWINGS

Further objects and advantages of the present invention can be found in the detailed description of the preferred embodiments when taken in conjunction with the accompanying drawings in which.

DETAILED DESCRIPTION OF THE PREFERRED EMBODIMENTS

The present invention relates to an interactive data retrieval system which assists the person accessing the system in formulating his or her data request and subsequently generating a report that is sent via facsimile to a prescribed facsimile machine. A method of interactively requesting data and producing the facsimile formatted report is also part of the invention.

Figure 1:
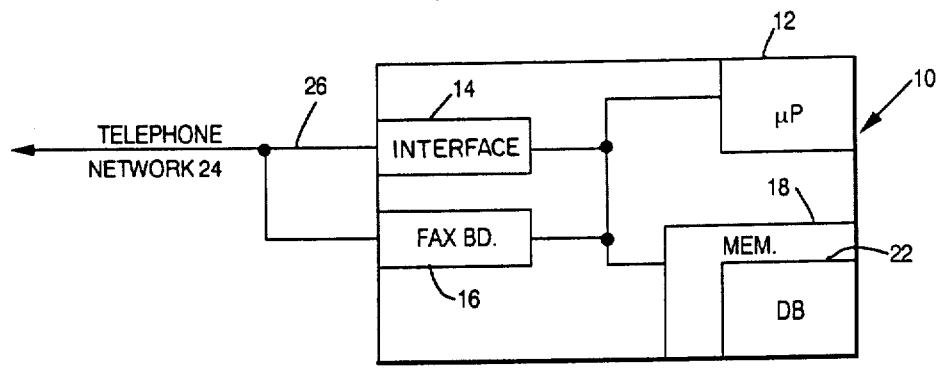
FIG. 1 diagrammatically illustrates the system configured on a single computer and coupled to a single telephone line.

FIG. 1 diagrammatically illustrates the system configured on a single computer and coupled to a single telephone line. Computer 10 includes microprocessor 12 that is coupled to telephone interface 14, facsimile or fax board 16 and memory 18. Electronically stored in memory 18 is a data compilation of records or data base (DB) 22. Memory 18 can be any type of memory, RAM, ROM, EPROM, a floppy disc or other media that electronically retains records. Of course, the program for operating computer 10 resides in memory 18. Telephone interface 14 and fax board 16 are coupled to telephone network 24 via a telephone line 26.

Figure 3:
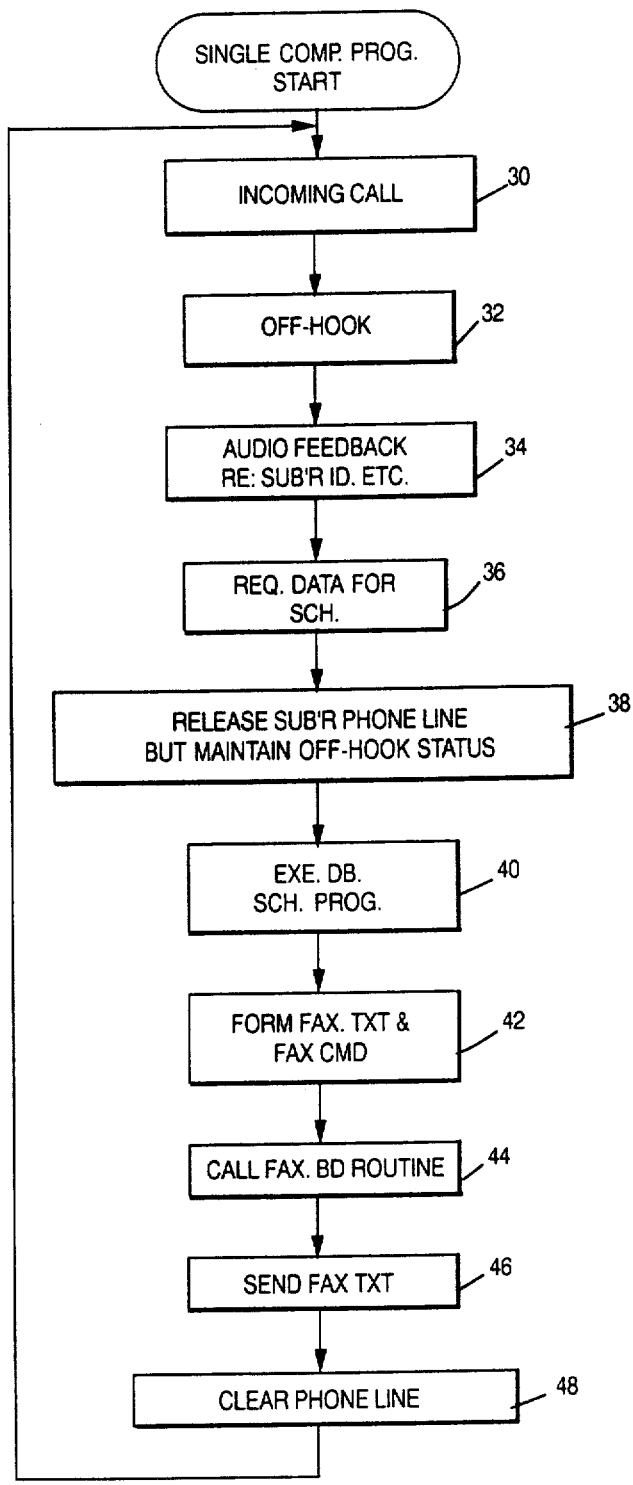
FIG. 3 is a general flow chart of the program operating on a single computer.

FIG. 3 is a general flow chart showing a simple version of the invention and the principal steps of the computer program when the program is run on computer 10 of FIG. 1.

The present invention assumes that the caller, subscriber, customer or user accesses the system via a telephone set that generates dual tone, multifrequency signals (DTMF signals). These DTMF signals are generated by TOUCH TONE TM telephones by depression of the keys on the face of the telephone. The present system is unique because the subscriber or customer uses the telephone to directly communicate with the computer and the computer generates audio signals that the customer or subscriber responds to by actuating the keys on the phone. The DTMF signals generated by the caller and ultimately received and decoded the computer cause the computer to search the data base generate a facsimile formatted report and send those signals over the telephone line to a facsimile machine designated by or unique the subscriber or customer.

In FIG. 3, computer 10 responds to an incoming call in step 30. The incoming call is initially handled by telephone interface 14 and microprocessor 12 recognizes the interrupt generated by telephone interface 14 and logs in the call and responds by generating audio feedback signals which are translated into audio signals and sent to the caller. The telephone interface has the capability of generating intelligent audio signals to the caller and storing, receiving or responding to DTMF signals from the caller. Telephone interface 14 will generate an off-hook signal for telephone network 24 in step 32. The computer generates audio feedback signals in step 34 which, after conversion into audio signals by the interface, prompt the caller to input his or her subscriber ID number, account number and possibly a security code. The audio feedback may further request that the caller input information request signals via the keypad on the caller's phone in step 36. In one embodiment, the information request signals may be requested from the caller several times such that the caller refines his or her search request. This is explained in greater detail hereinafter.

At some point during this interactive data communication between the caller and the computer, the caller generates a search command or order command by selecting the appropriate DTMF signals from the keypad of the caller's telephone set. At that time, computer 10 will, in step 38, release the subscriber's telephone line by "hanging up" but maintains the off-hook status of telephone line 26 to block incoming communications. Computer 10 then executes data base search program in step 40. This search program is simply a search through the data compilation of records to obtain the requested information or data as prescribed by the caller. In step 42, microprocessor 12, in association with memory 18 and data base 22, forms a facsimile text file (fax.txt) and a facsimile command file (fax.cmd). Computer 10 then executes step 44 which calls the fax board routine. In one embodiment, fax board 16 is an intelligent device in that it includes its own microprocessor and a predetermined amount of memory., This type of..fax board is sold under the name Gamma Fax Board and is manufactured by GammaLink of Palo Alto, Calif. This type of fax board has an 8186 microprocessor on it. The fax.txt file contains the electronic version of the facsimile report. The fax.cmd file contains the commands to operate the fax board and particularly contains the facsimile phone number or identifier of the caller. The fax board is initialized and then obtains all or some of the fax.txt file and sends it over telephone line 26 to the appropriate location. Prior to sending, interface 14 releases the line 26 and the fax board grabs the line to establish a communications link with another fax machine. Step 46 is illustrative of this process. After the fax.txt is sent, fax board 16 releases the line such that other subscribers or customers can then call computer 10, as shown in step 48.

Figure 2:
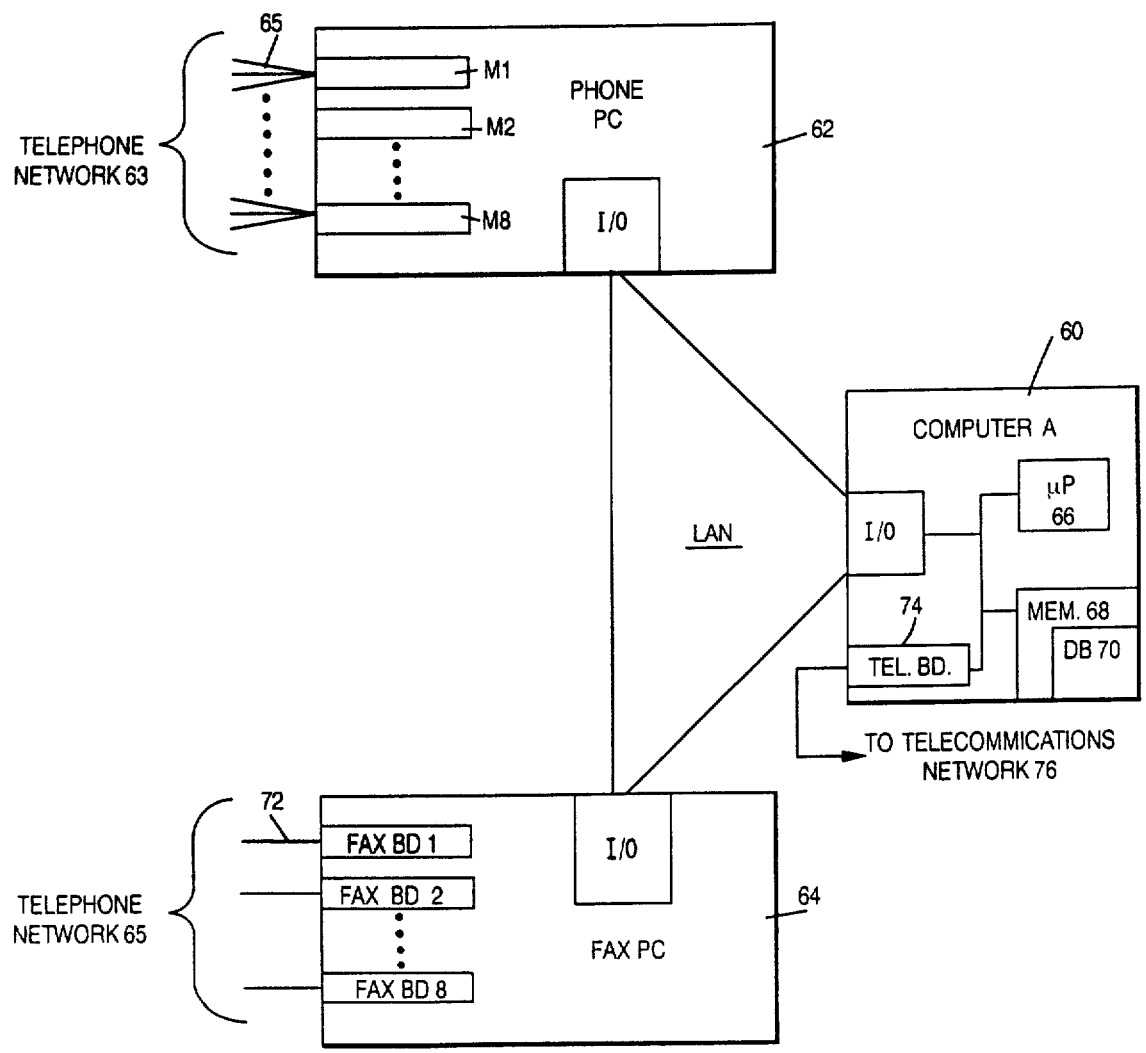
FIG. 2 diagrammatically illustrates a currently preferred embodiment of the system utilizing an input computer (phone PC), an output computer (fax PC) and a principal computer (illustrated as computer A)

FIG. 2 diagrammatically illustrates the currently preferred hardware configuration of the system. The system includes three computers, computers 60, 62 and 64. Although three computers are shown, it is recognized by persons of ordinary skill in the art that the interactive system can be run on a single computer that is capable of handling a plurality of telephone interfaces and fax boards. The claims appended hereto are meant to cover that configuration as well as the particular configuration illustrated in FIG. 2. Computer 62 is an input or phone PC (personal computer), computer 60 is computer A and computer 64 is an output or fax PC. Phone PC includes a plurality of telephone interfaces M1 through M8. There are eight interface in the current embodiment and each telephone interface is capable of handling four lines, therefore each interface is coupled to four telephone lines. Phone line 65 is one line that is part of telephone network 63. The phone PC can handle 32 incoming calls. Of course, computer 62 includes a microprocessor and some type of memory which is capable of initializing the telephone interfaces and handling the communications routines. Computer 62 is linked to computer A and to computer 64 via respective (I/O) ports and a local area network (LAN).

Computer A has an I/O port, a microprocessor 66 and a memory 68 in which is stored a data compilation or data base 70. Memory 68 also stores computer programs necessary to handle the communications, searching and maintenance of the data base. Computer 64, the fax PC, includes an I/O port connected to the LAN and a plurality of facsimile boards. In the current embodiment, eight fax boards (faxbd$_{1,2...8}$) are utilized. Each fax board is connected to a corresponding telephone line. For example, faxbd$_1$ is connected to telephone line 72. These telephone lines lead to the telephone network 65.

In some embodiments, one of which will be described hereinafter, real time data is accumulated in the data compilation or data base 70 via a telecommunications board 74. Telecommunications board 74 is coupled to a telecommunications network 76. The telecommunications network may be a satellite, radio or telephone system.

The current embodiment of the system utilizes the Unix operating system. With this operating system, the phone PC and the fax PC are remote computers and the bulk of the operation is carried on by computer A. In this embodiment, computer A is a 386 or 286 AT type machine. Memory 68 includes a hard disc drive and a large RAM memory. Currently, the computer includes 4 megabytes of RAM and 30 megabytes on a hard drive. The telephone interfaces in phone PC 62 are smart boards which have about 120,000 bytes of memory. Each board handles four channels or telephone lines. Telephone interface audio boards of this type are manufactured by Dialogic Corp., located in New Jersey. The fax boards in fax PC 64 are also smart boards and each includes an 8186 processor and a certain amount of memory. Currently, computer A utilizes a data base program entitled Fox base Plus manufactured by Fox Software, Inc. of Perrysberg, Ohio. Although the current embodiment utilizes a Unix operating system, other multi-user, multitasking operating systems could be utilized. The Unix system is used because the program can be easily upgraded such that a large computer or mainframe could handle all the telephone audio interface boards M1 through M8 as well as the fax boards faxbd$_1$–faxbd$_8$ without the necessity of the remote PCs and the LAN.

It is also possible to utilize a DOS multitasking system such as a VM386 operating system, PCMOS operating system, or an OS2 operating system. The system may also be configured with computer A being a central file server wherein the files are maintained in memory 68. When computer A is a file server, the search routines and processing occurs in computer 62 and the files are simply stored in computer A. In this alternate embodiment, computer 62 would conduct the search, upgrade the data base and form new fax.txts and fax.cmds. This occurs by the transfer of the files across the LAN. For example, a Novell SFT LAN could be used. The current embodiment of the system utilizes the Unix operating system and computer A executes the programs and utilizes the on site memory whereas computers 62 and 64 are considered remote PCs. To recap, the system can be configured as a simple, single user system (FIG. 1) operating with a DOS system. The system can be configured with a multitasking DOS type operating system servicing a number of incoming and outgoing phone lines somewhat or a concurrent basis. The system can be further configured with computer A being a central file server on a LAN. Additionally, the system can be configured with computer A running a Unix type operating system as a true multitasking, multi user system. Lastly, the system can be configured on a large single computer that is capable of interacting with a plurality of telephone audio interfaces and a plurality of facsimile boards in a multi-user, multitasking environment.

Figure 4:
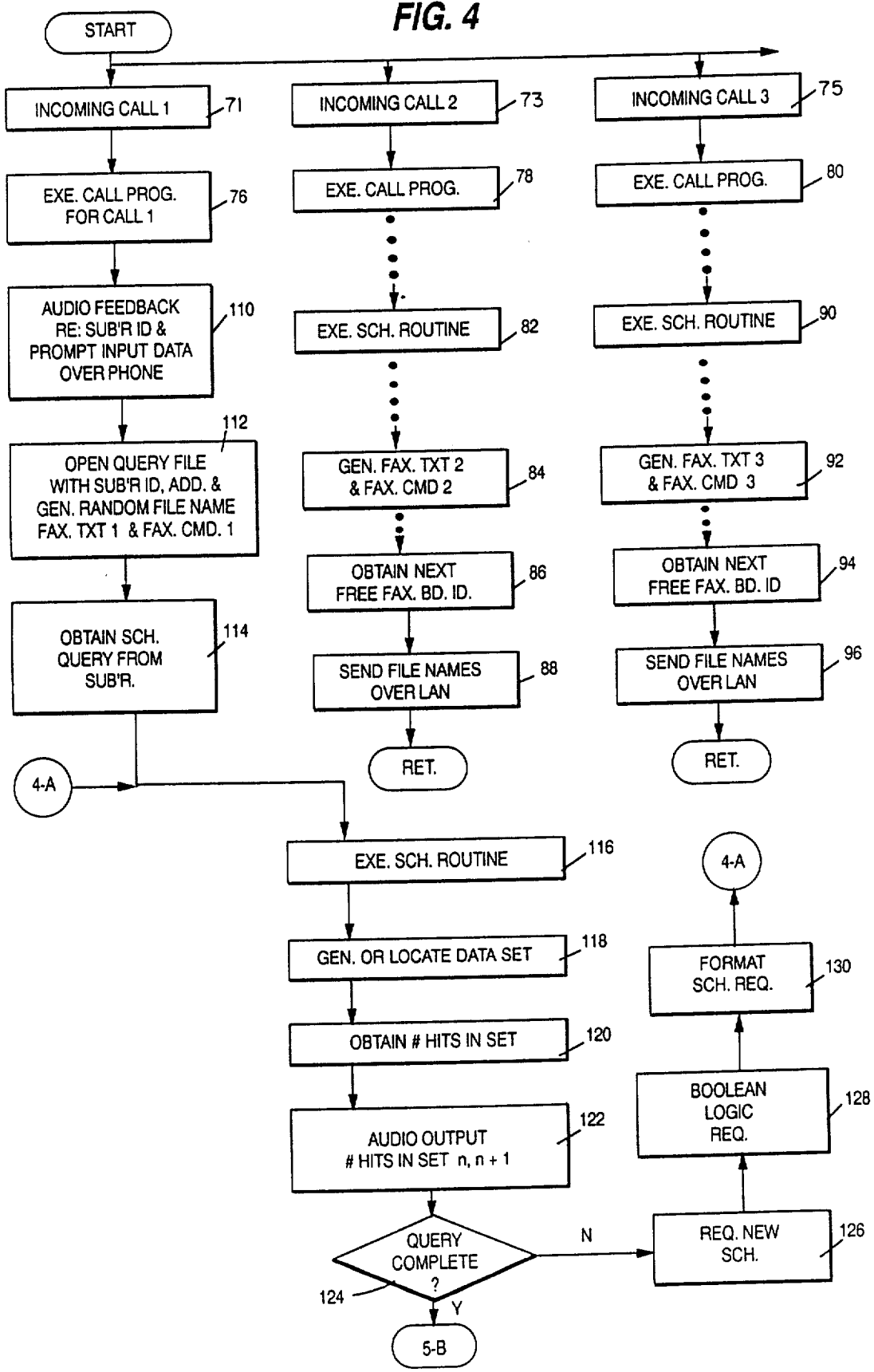
FIG. 4 is a flow chart in block diagram form showing a currently preferred routine.

FIG. 4 is a flow chart showing the general steps of the principal program that provides interactive communication with the subscriber or user and the formation of the facsimile report based upon the information requests from the subscriber. FIG. 4 shows, in steps, 71, 73 and 75, incoming calls 1, 2 and 3. Each incoming call starts a process on the Unix machine or computer A. This process includes executing a call program in steps 76, 78 and 80. As a summary of the operation, incoming call 2 generally includes executing a search routine in step 82, generating a fax text and a fax command file (fax.txt2 and fax.cmd2 files) in step 84, obtaining the next free fax board from a queue holding fax board identifications (faxbd.ID) in step 86, sending the file names fax.txt2 and fax.cmd2 over the LAN in step 88 and then returning to the beginning of the program shown in FIG. 4. Similarly, with respect to incoming call 3, a search routine is executed in step 90, fax.txt3 and fax.cmd3 files are generated in step 92, the next fax board is located by the faxbd.ID in step 94, the file names fax.txt3 and fax.cmd3 are sent over the LAN in step 96 and then the program returns to the beginning. All calls are handled substantially concurrently in the multitasking, multi-user environment. Therefore, the details for incoming call 1 are similar to all the other incoming calls. In general, the Unix operating system can run multiple copies of the data base routine or search routine substantially concurrently. However, each process is handled on a per subscriber basis. Therefore, as shown in FIG. 4, the process would go forward for calls 1, 2 and 3 on a substantially concurrent basis but the individual steps within the process occur sequentially on a per subscriber basis.

In step 110, the system prompts or requests that the subscriber or user input his or her identification or account information into the computer by utilizing the keypad on the DTMF phone. The system requests are audible signals generated by intelligent telephone interfaces M1–M8. In step 112, computer A generates a random code or file name unique to this particular inquiry by the subscriber. These file names are designated herein fax.txt1 and fax.cmd1. Additionally, a caller log-in file is established. In step 114, the system than audibly requests the search query from the subscriber. In step 116, the system executes a search routine through data base 70. Data base 70 is a data compilation of records. Step 118 generates or locates a data set related to the data compilation. The information submitted to the computer initially comes in over one of the phone lines in telephone network 63 of FIG. 2. As a example, phone line 65 would carry these information request signals and search commands from the subscriber. These signals and search commands are configured as DTMF signals that are generated by the subscriber selecting the appropriate key on the keypad of the DTMF phone. The audio responses are generated by telephone interface M1 in accordance with electronic signals that, when applied with an appropriate command to telephone interface M1, generate audio signals which are sent over telephone line 65 to the subscriber or user of the system. On the input side, telephone interface M1 converts the DTMF information request signals into electronic signals and computer A converts those information request signals into appropriate search requests. The subscriber may be prompted to utilize a structured query language or may be prompted to key in other types of simplified search requests and commands, as appropriate.

Step 118 generates or locates a data set from the data compilation of records or data base. In one embodiment, the search routine calculates the number of records identified in the data set in step 120. This number of records can be characterized as the number of hits found during the search. Step 122, in this embodiment, generates audio response signals based upon the characteristic of the data set. In other words, the characteristic is the number of hits in the data set. These audio response signals are sent to telephone interface M1 and interface M1 generates audio signals to the subscriber such that the subscriber or user then audibly hears the results of his or her initial information request. The characteristic audibly reported to the caller or subscriber may also relate to the frequency or number of records in a particular range. For example, the audible response may be "You have found 50 records out of a possible 100." Other types of characteristics of the data set could be audibly reported to the caller.

In another embodiment, the subscriber may be prompted to input his or her account number or subscriber ID as well as a security code. In step 114, this subscriber ID and security code would be obtained from the subscriber. A search routine would be executed in the data base to locate a stored subscriber ID and confirm that the input security code matches the stored ID. During such a search, the computer locates a subscriber record stored in the data base. This subscriber record then can be considered as the data set identified in step 118. Step 120 may involve confirming the security code that the subscriber input with the security code stored in the data base. This confirmation of the security code is a characteristic of the data set. The audio response in step 122 could, therefore, be an audible confirmation to the subscriber that he or she is permitted to access the main portions of the data base. In this manner, the system includes an access control which permits electronic access to the computer system only after receipt of an appropriate subscriber ID. The stored subscriber ID can be considered in this embodiment to be part of the data compilation.

An important feature of the present invention is the interactive communications with the subscriber, user or customer. The interactive communications link involves audio signals initially generated by the computer instructing the subscriber, customer or user in the manner of accessing the computer. The person accessing the computer then transmits DTMF signals to the system and those signals represent information request signals. In terms of a specific embodiment, those information request signals include, among other things, a search string which is interpreted by the computer and converted into a search request command. The search request command is then utilized to conduct a search of the data compilation and obtain a data set. The data set is then further analyzed and a certain characteristic of the data set is obtained. This characteristic may be the number of hits or the number of records represented in the data set or may be a confirmation that the user is permitted to further access the system.

In a particular application, the data base may contain information regarding individuals seeking employment. These individuals are candidates for employment. An example of a candidate data record is as follows:

CANDIDATE DATA RECORD

Name

Address

Phone # (work and/or home)

Confidential Status of Limit Inquiries

Gender

Job Title

Technology

Age

Education

Years of Experience

Salary Range (high and low)

Geographic Preference

The subscriber may request a list of all candidates in a certain geographic area who have experience in a certain technical field, such as data processing. This could be done by prompting the subscriber to input a structured search query language information request signals into the DTMF phone. Based upon these signals, a search of the data base is conducted and a data set is constructed that identifies candidates that comply with the parameters specified by the subscriber. The computer would then count the number of records represented in the data set and audibly inform the subscriber how many records were found. If the search identifies 200 records or candidates, the subscriber may not want such a large number of candidates. The subscriber may then wish to modify or narrow the search. Step 124 is a decision block which requires input from the subscriber. If the subscriber is satisfied with the initially reported search results, the yes branch is taken and the flow chart continues from FIG. 4, point 5-B, to FIG. 5, point 5-B. Assuming that the subscriber is not satisfied with the initial search request results and wishes to narrow the search to less than 200 candidates, the no branch is taken and in step 126, the subscriber inputs a new search. In step 128, the subscriber has the ability to input a boolean logic command which would link or in some manner relate &o the results of the previous search and, in step 130, the program returns to step 116 the execute search routine.

The data compilation of records may include a number of indexes or tables that summarize the content of the entire data base. As used herein, the term "data base" includes the actual compilation of records as well as all indexes or tables that summarize those records. In the specific application of the program relating to job candidates described above, an exemplary list of indexes or tables may be as follows:

CANDIDATE DATA TABLES

Education

Skills (CEO, Data Processing, Sales Manager)

Address

Geographic Region

Salary Range

The indexes or tables may be periodically updated every time the data base itself is modified. In any event, some type of search is conducted through the data base based upon the information request signals sent by the subscriber, customer or user and an audio response is generated by the system such that the person can intelligibly respond further.

If the person accessing the system is satisfied with the audible response, that person issues a DTMF search command signal over telephone line 65 to telephone interface M1. This search command signals the system to complete the search. The search command may be part of the initial search string if the subscriber, customer or user so desires. The system may simply confirm to that person that the search will be completed and appropriately processed. The system then releases the incoming call or phone line and makes that line available for other callers or subscribers.

Figure 5:
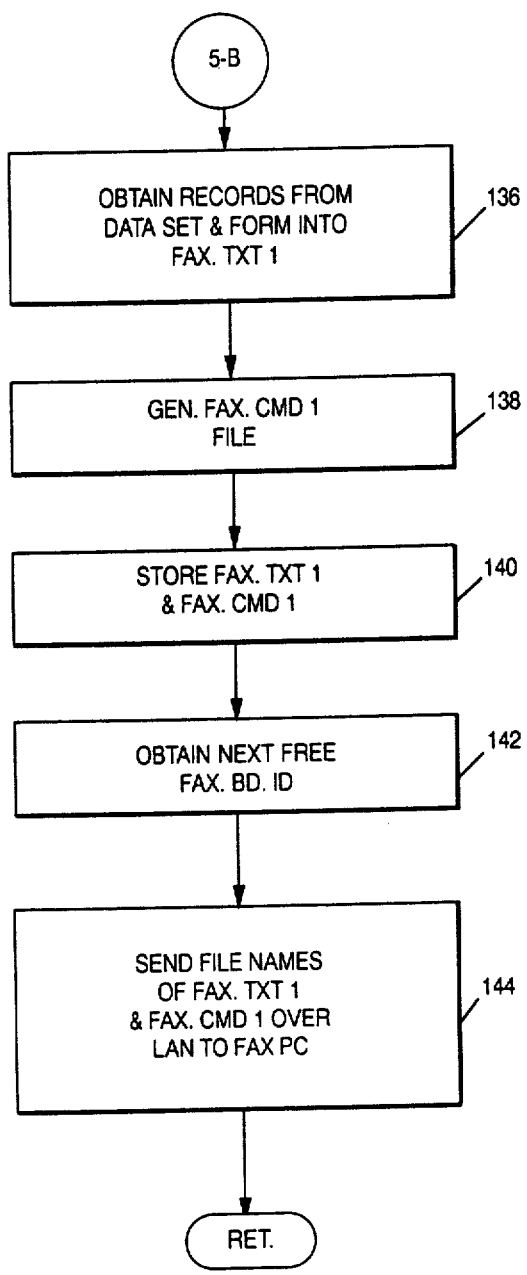
FIG. 5 is a continuation of the flow chart shown in FIG. 4 beginning with jump point 5-B from FIG. 4.

FIG. 5 continues the general flow chart of the program. See jump points 5-B in FIG(. 4 and 5. In step 136, the program obtains the records from the data compilation or data base 70 based upon one or more of the data sets ultimately selected as being appropriate by the person accessing the system. These records are formatted into a fax.txt1 file that is unique to incoming call 1. Fax.txt1 would include the subscriber's name, address, account number and an appropriately formatted report of the data obtained from the search. In the particular application described above with respect to job candidates, this report may include all of the candidate records or some of the candidate records, as is appropriate. For example, the candidates themselves may wish to limit the amount of information given to prospective employers or people seeking to link employers and job candidates. This confidential status or limit inquiry command by the candidates could be reflected by the system limiting the amount of information provided for that candidate in the report.

In step 138, the system generates a fax.cmd1 file or facsimile board command file that is associated with the fax.txt1 file. The fax command file is necessary to initialize the fax board. The fax.txt1 and fax.cmd1 files are stored in the memory in step 140. In step 142, the system obtains the free fax board identifier from the fax queue. This is faxbd.ID. As currently configured, the fax boards in computer 64 are intelligent. Therefore, each fax board has associated with it a faxbd.ID and that fax board identifier is stored in a queue in memory 68. When the fax board is available or open for transmission of reports therefrom, the fax board ID is placed in this queue. Step 142 obtains the next available fax board ID and sends a limited number of commands to that fax board. As an example, faxbd$_1$ may be accessed in this manner by computer A. The file names fax.txt1 and fax.cmd1 are sent over the LAN to faxbd$_1$ in step 144. When the file names are transferred, the intelligent fax boards then take over the output of the facsimile formatted reports thereby freeing up the computer to handle the other calls in a more efficient manner.

Figure 6:
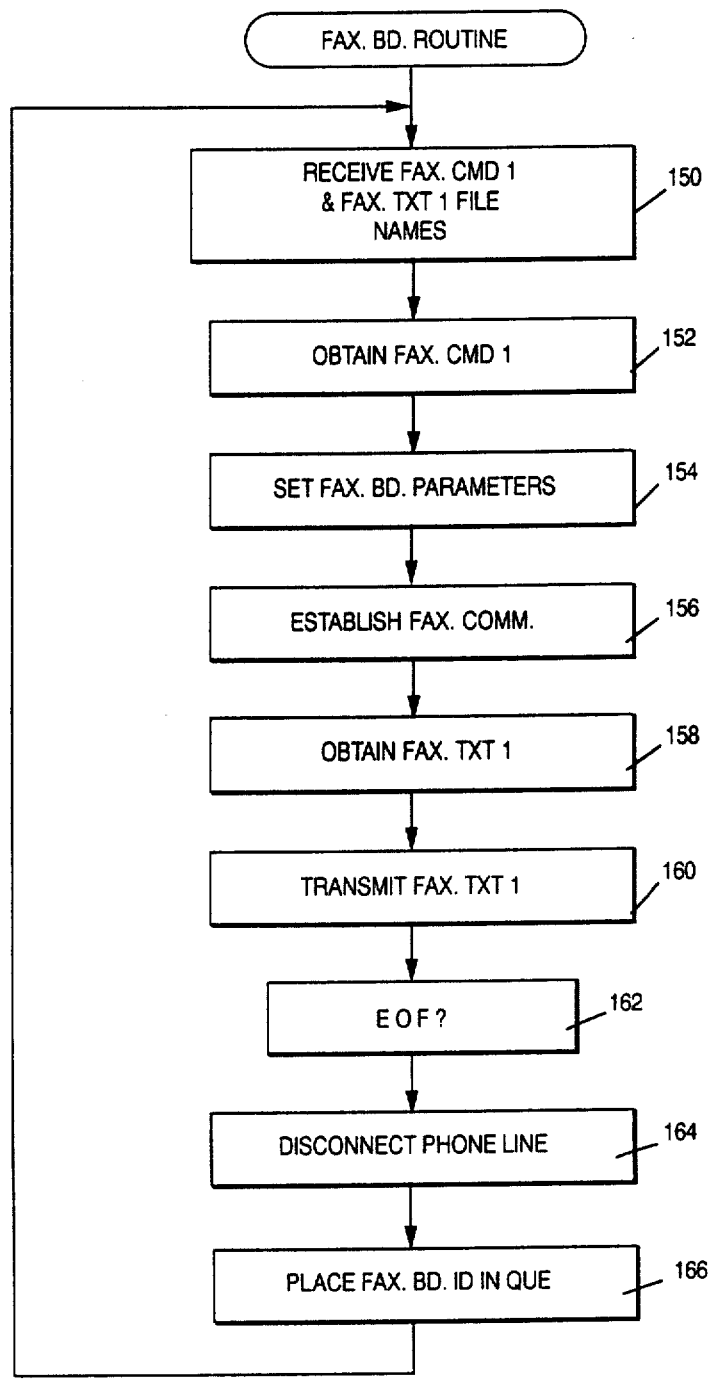
FIG. 6 is a general flow chart of the fax board routine.

FIG. 6 is a general flow chart of the fax board routines. Since the fax boards are intelligent devices having a microprocessor on each board and some memory, a small number of commands need only be sent by computer A to the fax board and the fax board then accesses the appropriate files in memory 68 on it own initiative. In step 150, the fax board receives the fax.cmd1 and fax.txt1 file names. The board then obtains, in step 152, the fax.cmd1 file. Based upon the information in this file, the fax board sets its communications parameters in step 154. These parameters would include at least the phone number of the facsimile device that the subscriber wants the facsimile formatted report sent to. In step 156, the fax board, for example faxbd$_1$, establishes a communications link with the subscriber's facsimile device over phone line 72. After the communications link is established or before, as is appropriate for the particular board, the fax board obtains file fax.txt1 in step 158. In step 160, the fax text is sent over phone line 72. Dependent upon the amount of memory in the fax board, the fax board may obtain all or part of the fax.txt1 file. The fax boards are facsimile transmission devices and send facsimile formatted signals over phone line 72. In the single computer system illustrates in FIG. 1, fax board 16 would send these facsimile formatted signals over phone line 26.

Step 162 in FIG. 6 determines if the end of the fax.txt1 file is reached. Upon such conclusion, phone line 72 is disconnected in step 164. Subsequently, faxbd$_1$ places its faxbd.ID in the availability queue in memory 68 of computer A. This occurs in step 166.

In addition to the foregoing steps, the system most likely will keep track of the number of times the subscriber has accessed the system to obtain information via the fax transmission devices. Therefore, each time the subscriber accesses the system, a log-in file would be opened for that particular subscriber logging in the transaction and keeping track of various information regarding the transaction. This may include the amount of time the subscriber accessed the system, the amount of searching done by the subscriber, or the length of the report generated by the fax transmission devices. In addition to logging in the transaction, the system may track the subscriber's usage and do an accounting of the usage and subsequently bill the subscriber either by printing a bill, or in a most efficient configuration by billing the subscriber and sending the bill over the fax boards. Further, there may be some additional closing routines such as deleting the fax text and fax command files and any intermediate data or data set files formed during the searches.

Although the system has been described in conjunction with at least one application of the system, that is to obtain prospective job candidates, the system is not limited to that application. The interactive data retrieval system can be used to produce facsimile formatted reports based on any type of data inquiry. Also, although the sequential steps have been described herein, it is possible that the subscriber or user could request that the system automatically produce one or more reports on a periodic basis. For example, the subscriber may request all new data added to the data compilation be sent to him or her, via the fax, on a daily or other periodic basis. The system could also accommodate having the subscriber input his or her facsimile phone number during the initial prompting of the subscriber in step 112 in FIG. 4. Further, an option could be provided to the subscriber to have the facsimile report sent to a number of different facsimile machines designated by the subscriber.

Figure 7:
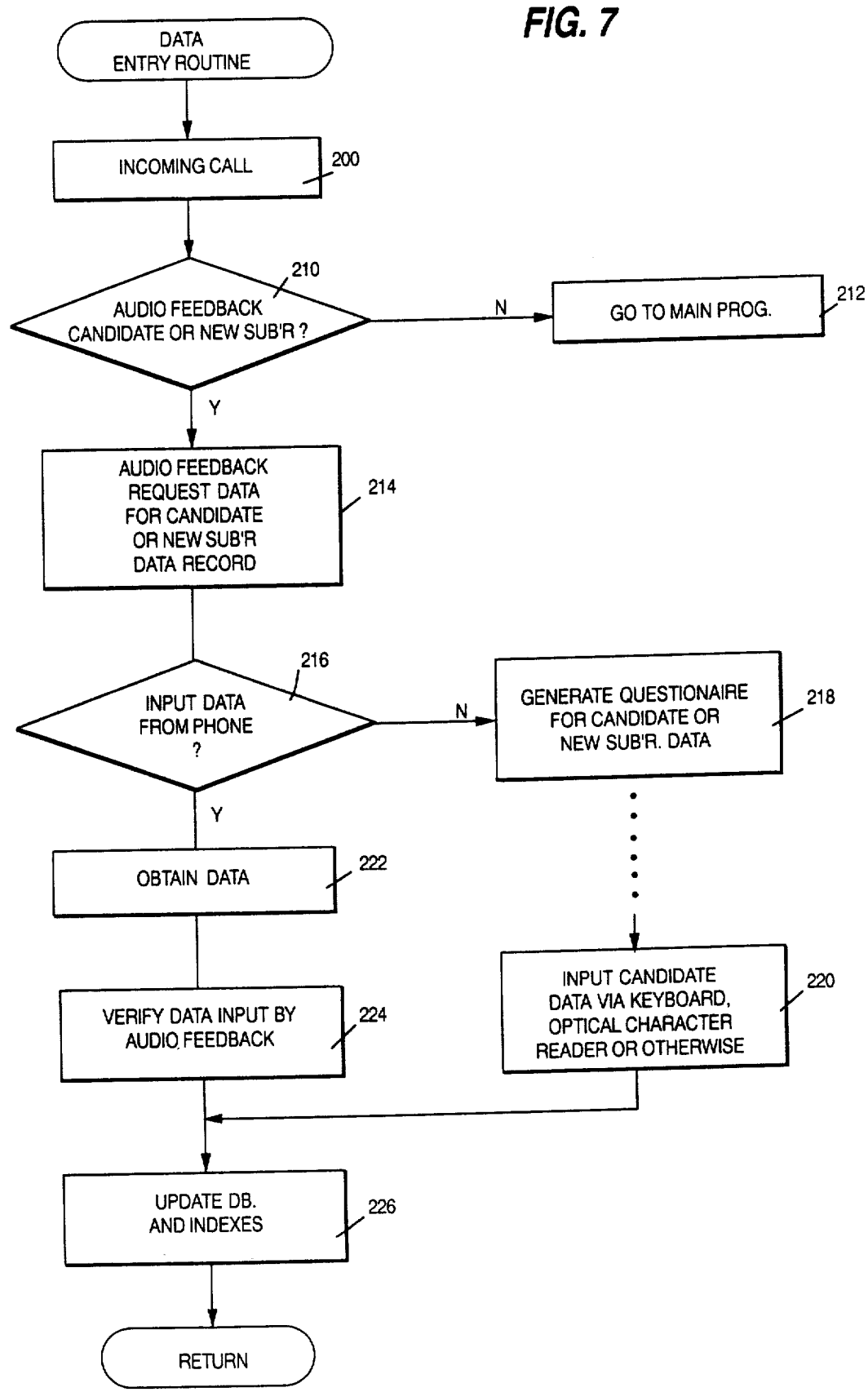
FIG. 7 is a general flow chart, in block diagram form, showing a data entry routine as configured for one embodiment wherein subscribers can log into the system and new candidates or individuals seeking employment can place information into the data compilation.

FIG. 7 is a general flow chart of the data entry routine. This data entry routine may be integrated into the main program illustrated in FIG. 4. In step 200, the system answers and handles the incoming call. In step 210, a decision is made interactively with the caller to determine whether the caller falls within one or another of a certain caller category. In the example shown in FIG. 7, one category is for candidates and new subscribers and the second category is old subscribers. Other types of caller categories could be identified. For example, the system could be configured to produce financial reports based upon financial data stored in the data base and decision step 210 could determine whether the caller is a new subscriber to the financial reporting system. In any event, in the particular application shown in FIG. 7, if the caller is an old subscriber, the program in step 212 jumps to the main program or step 76 in FIG. 4. If the caller is a candidate or new subscriber, the yes branch is taken and step 214 is executed. This step prompts the candidate/new subscriber to input data regarding the caller. For example, this step may audibly request and prompt the caller to input data regarding the candidate as shown above in the Candidate Data Record. Decision step 216 requests the caller to designate whether he or she wishes to input data via the DTMF phone or otherwise. If the caller does not wish to input data through the DTMF phone, in step 218 the program generates a questionnaire for the candidate. This questionnaire could be mailed to the candidate/new subscriber or, alternatively, could be formatted as a facsimile text file and sent to the candidate/new subscriber via the facsimile transmission boards faxbd$_{1-8}$ to a facsimile device designated by the caller. In any event, the caller would have to return the information and that information would be input into the system in step 220. This input could be manual or via keyboard, could be input via an optical character reader or otherwise such as by punchcards or similar machine readable formats. Electronic data entries between two computers is also possible.

If the yes branch is taken from decision step 216, the system obtains the data over the DTMF from the caller in step 222. This information is audibly verified in step 224 in order to confirm the accuracy of the data input via the DTMF phone by the caller. In step 226, the data base data compilation of records and any indexes or tables are updated.

If this data entry routine is configured for a new subscriber, in addition to decision step 210, the system could request whether the subscriber wishes to have access to the computer system. If so, the data entry routine would jump to the main program illustrated in FIGS. 4 and 5.

If the subscriber is an old subscriber and simply wants to change information in the data base, for example change his or her facsimile phone number, the appropriate audio feedback and decision blocks can be added to the data entry routine and the subscriber can modify records in the data base. This modification of records is simply a different information request signal and search modification command that could be incorporated into the main program shown in FIGS. 4 and 5.

Figure 8:
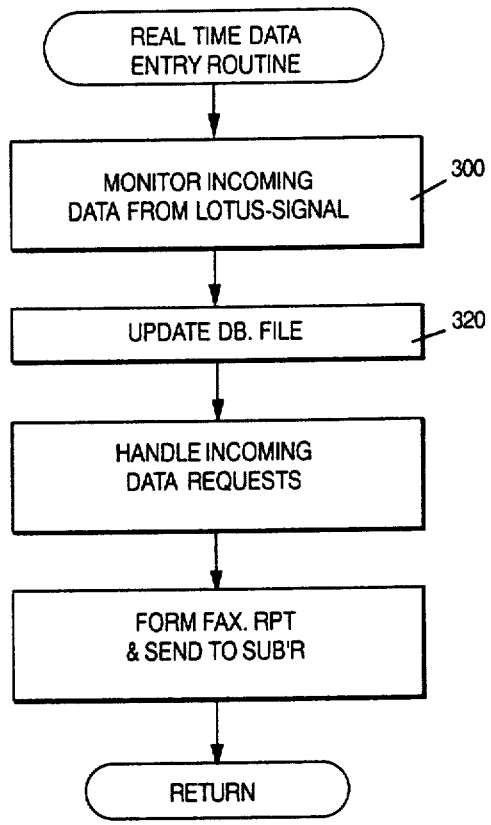
FIG. 8 is a general flow chart showing a real time data entry routine specifically adapted to monitor financial data and input it into the data compilation.

FIG. 8 is a general flow chart of a real time data entry routine. Real time data entry can be accomplished by telecommunications board 74 in computer A shown in FIG. 2. The telecommunications board could also be located in one of the remote PCs. Telecommunications board 74 is linked to a telecommunications network 76. Real time data entry permits the records in the data base to be automatically updated other than through telephone interfaces M1-M8, manually or otherwise such as with an optical character reader. In a particular application, the real time data could be time critical data which changes periodically. This could be changes in inventory if the system is configured as a purchasing system, or could be financial data that changes continually such as hourly, daily, yearly or over periods of time. As an example of this aspect of the invention, telecommunications board 74 may monitor stock, bond and other financial information that is available through various wire or telecommunication services. For example, the telecommunications board 74 and its associated program are sold as a LOTUS-Signal Board and Software. The LOTUS-Signal monitors the ticker tape of the stocks, bonds, commodities and various financial data and indexes. This is illustrated in step 300 in FIG. 8. The software program associated with LOTUS-Signal can be configured to update the data base as diagrammed in step 320. The incoming signal into telecommunications board 74 is a sequentially presented stream of data. The data includes data tags and a plurality of time critical variable data. In the particular example, the stock code corresponds to the data tag and the price of the stock corresponds to the time critical variable data. Data base 70 (FIG. 2) would contain a record of at least a group of select data tags or stock codes. The program would monitor the stock ticker tape, and store the time critical data associated with the data tags that are similar to the selected data tags. For example, if a subscriber wished to monitor the daily performance of IBM stock, the stock code for IBM would be the select data tag. The LOTUS-Signal software would monitor the ticker tape data coming over the telecommunications network 76 and when the IBM stock code appeared along with the current price, the program would store the current price of the IBM stock in data base 70.

In order to permit the subscriber to select the data tag and monitor a particular stock, the data entry routine for the subscriber could be modified such that the subscriber could input the stock code or data tag for the IBM stock via a DTMF phone. The data entry routine shown in FIG. 7 can be modified to accomplish this data tag selection by the subscriber. Of course, other financial or commercial information could be stored and monitored on a real time basis by the system. This information may include call letters for stocks, bonds, commodities, futures, options, interest rate identifiers, composite indexes and government statistics. The time critical variable data represents monetary values, level indicators, rates of change and other numerical quantities that change over time and are associated with the data tags.

The telecommunications board shown in computer A in FIG. 2 could further be incorporated into computer 10 shown in FIG. 1. The LOTUS-Signal program could also be operated on computer 10.

In this particular application, the facsimile formatted report could be configured as a spread sheet. The spread sheet could show trends of the stocks, bonds, commodities, etc. over time either on a daily, monthly, yearly, or longer basis. Various comparisons could be made regarding, for example, the inflation rate vs. changes in the gross national product vs. changes of stock price. The system could be configured to permit the subscriber or caller to select the form of the report and receive the appropriate facsimile formatted report by a subscriber fax machine.

Figure 9:
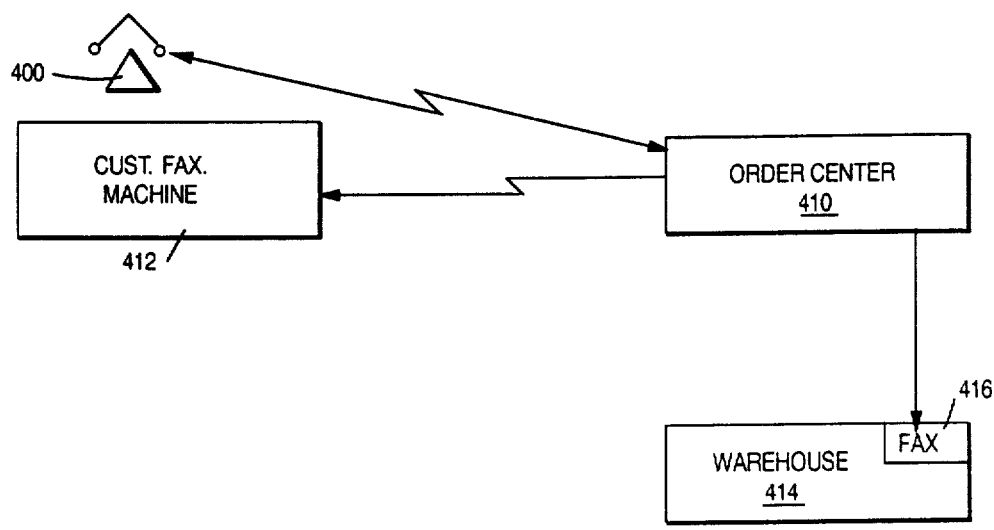
FIG. 9 diagrammatically illustrates the interactive data retrieval and purchasing system.

The interactive retrieval system can also be configured as a purchasing system. FIG. 9 diagrammatically illustrates the general features of such a system. The customer would utilize DTMF phone 400 to interactively communicate with the order center 410. Order center 410 would include a computer system similar in many respects to the system shown in FIG. 2 above. The customer would also have a customer fax machine 412 that would receive order confirmations or the actual invoice or bill for the goods ordered. The purchasing system could also include interaction with a warehouse 414 which has its own facsimile device 416.

Figure 10:
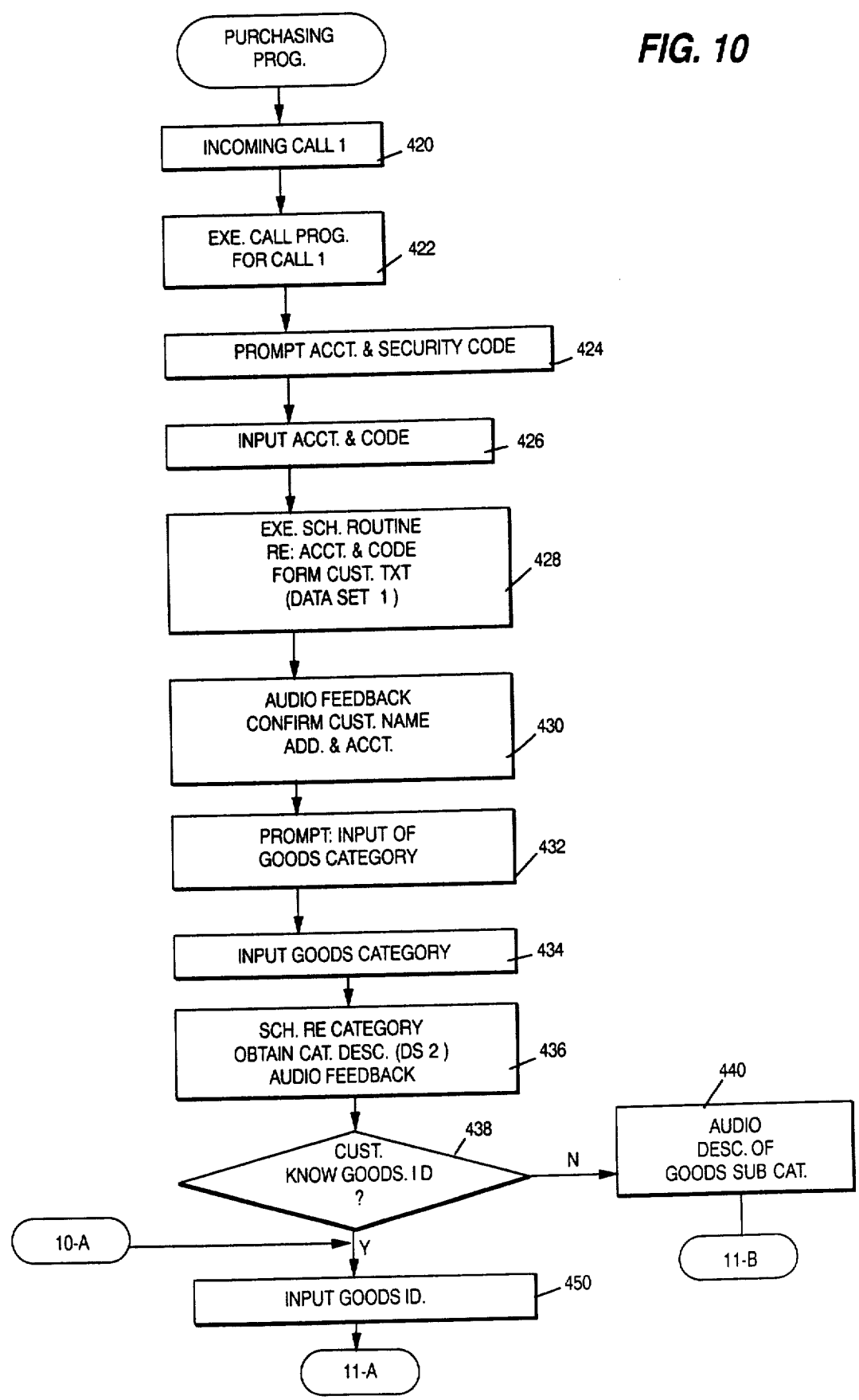
FIG. 10 is a general flow chart of the purchasing program that incorporates the interactive data retrieval and search routines and facsimile reports in accordance with the principles of the present invention.

FIG. 10 is a general flow chart of the interactive data retrieval and purchasing system. The system is preferably run on a Unix machine which can handle numerous incoming customer calls. In step 422, the call program is executed which prompts the customer to input his or her account and a security code in step 424. The customer inputs the account and code in step 426. The system then executes a search routine in step 428. The search routine includes a search through the data compilation or data base for the customer's account and security code to insure that the customer is permitted to order goods or services form order center 410. In step 430, the system provides audio feedback to the customer confirming his/her name, address, account number and any other pertinent information. In step 432, the system prompts the customer to input a category of goods. In step 434, the customer inputs the category by sending DTMF signals as information request signals. It should be noted that the customer account and security code are also information request signals since a search is conducted through the data base at that time and an audible response is produced by the computer system. This audible response is based on data set 1, the confirmation to permit further access into the system.

In step 436, a search of the data base is conducted to obtain a goods category description. This is data set 2 (DS2), whereas the customer account and security code search resulted in data set 1. It may be beneficial to the customer to audibly confirm the description of the goods (based on DS2) before he or she places the order. In decision step 438, information is sought from the customer as to whether he or she knows of the goods identification. This may be a model number, stock number or other specific identifier that distinguishes particular goods from other goods in the inventory. If the customer does not know the goods identification code, in step 440, the system audibly describes sub-categories of goods or audibly reports the goods numbers for particular goods already obtained in that category. Following jump point 1-B from FIG. 10 to FIG. 11, the customer in step 442 inputs a goods sub-category. Another search of the data base is conducted in step 444 and data set 3 (DS3) is located and audio signals are generated to notify the customer of the results of that search. Decision step 446 determines whether the customer has enough information to order the specific goods that he or she wants. If the no branch is taken, in step 448 the system releases the customer call phone line, obtains all the records relating to the goods in that particular category, and forms a facsimile text file (fax.txt) which is a list and description of all the goods plus the goods identifiers in one or more of the data sets 1, 2 or 3. In step 449, a fax text file is compiled and merged or associated with the cust.txt file that holds information regarding the customer, such as his or her address, name, account number, etc. Following the formation of a fax text file, the program then returns to the fax board routine shown in FIG. 6. Of course, preliminary thereto a fax.cmd file would have to be constructed as discussed above.

Returning to decision step 446, if the yes branch is taken and the customer has enough information to order the goods, jump point 10-A returns the program to FIG. 10 jump point 10-A. At this step, a determination is made whether the customer knows the goods identification number, i.e., decision block 438. In step 450, the customer inputs the goods identification number. The program continues, as noted by jump point 11-A in FIGS. 10 and 11. The system in step 452 searches the data base for the goods identification number and forms an order text ord.txt. This corresponds to data set 3A. In step 454, the system confirms the order by sending audio signals to the customer describing the goods and prompting further information such as where the goods should be shipped, who the goods should be billed to and the number of units of the goods to be shipped. In step 456, the system audibly confirms the entire order with the customer.

In step 458, the system obtains the records from data set 1, the information regarding the customer such as name, address, shipping address and billing information (cust.txt), as well as a detailed description of the goods. In step 460, a fax text file is made with the order text file and the customer text file. Step 460 may additionally construct a warehouse (whse) text file. In step 462, the facsimile is sent to the customer as either an order confirmation or an invoice, or both. In step 464, a facsimile report is sent to warehouse 414 which is the internal order listing the goods to be shipped to the customer.

Alternatively, the order sent to the warehouse could be sent electronically between computers linking order center 410 and warehouse 414 rather than through the facsimile report.

Figure 11:
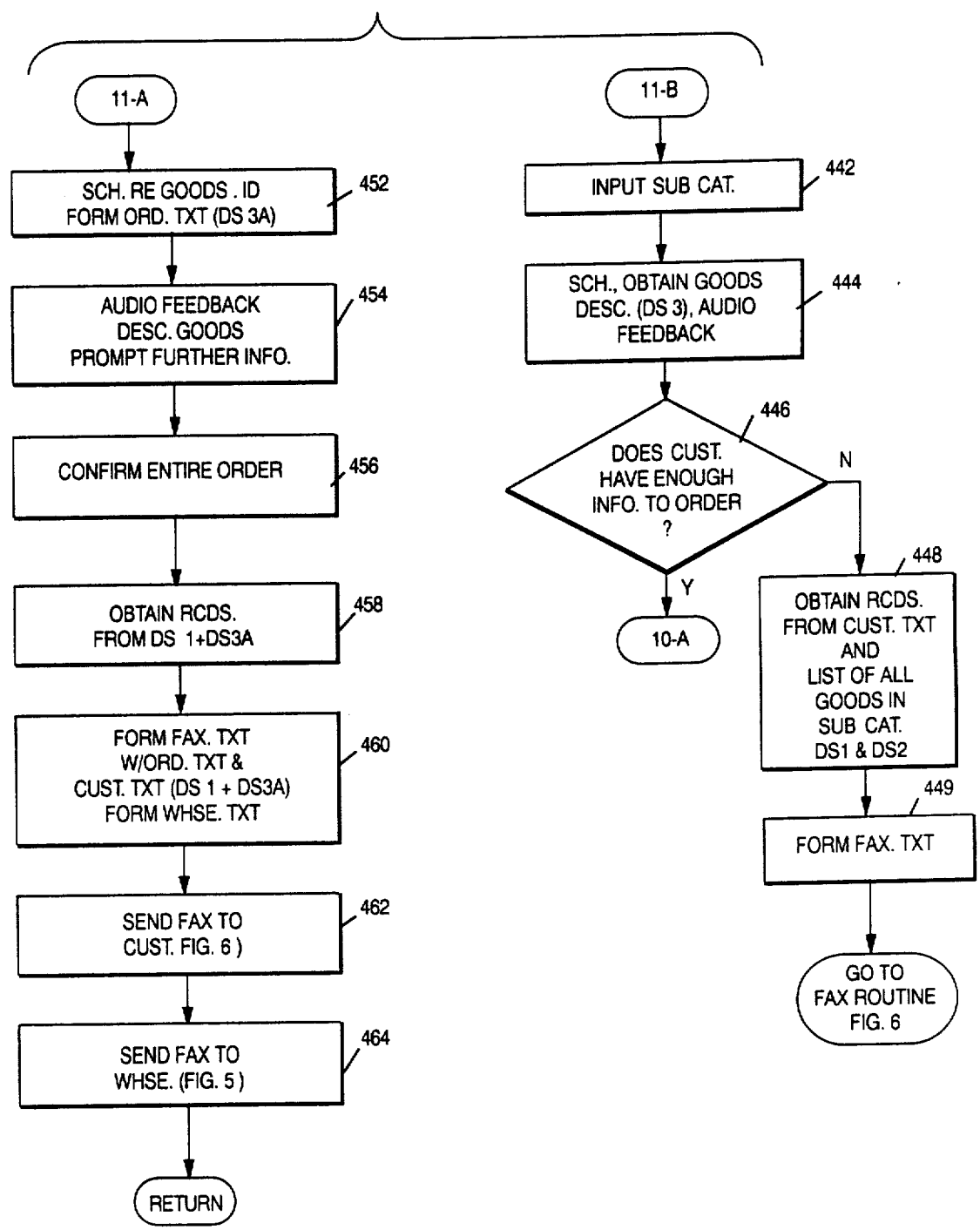
FIG. 11 is the balance of the general flow chart of the purchasing program from jump points 11-A and 11-B in FIG. 10.

In addition to the foregoing, the warehouse may be electronically linked by a computer to order center 410 such that when the inventory changes in the warehouse, that time critical variable data is sent to the order center 410 via a telecommunications network. In this situation, the data tag would be the goods identification number and the time critical data would be the amount of inventory currently available for sale. Additionally or alternatively, the time critical data could be the anticipated date of shipment which could vary dependent upon the amount of inventory or the manufacturing time of the goods. The flow chart of the purchasing system in FIGS. 10 and 11 is only exemplary since the program may be simplified or made more complex dependent upon the number and type of customers accessing the system and goods available through the system.

The claims appended hereto are meant to cover modifications and changes within the spirit and scope of the present invention.

What is claimed is:

1. A method of interactively requesting data over a telephone line from a computer system and having the computer system produce facsimile formatted report signals based upon dual tone multifrequency signals as information requests from a subscriber comprising the steps of:

maintaining an electronic data compilation of records, each record having a plurality of fields therein;

receiving information request signals over the telephone lien from the subscriber representing an initial data inquiry;

electronically formulating a search request command based upon said information request signals unique to at least one field of said plurality of fields;

searching through said at least one field in said data compilation and obtaining a data set based upon said search request command;

electronically generating and sending audio signals over said telephone line reporting the number of records in said data set to said subscriber;

receiving further information request signals over the telephone line from said subscriber;

formulating a further search request command based upon said further information request signals, obtaining a further data set, and electronically generating and audibly reporting the number of records in said further data set to said subscriber over said telephone line;

obtaining a search complete command signal from said subscriber over said telephone line;

compiling records from said data compilation corresponding to at least one of said data set and said further data set;

formatting said corresponding records into a facsimile formatted report, and generating and transmitting signals representative thereof over said telephone line.

2. A method of providing an interactive communications, regarding dual tone multifrequency signals as information requests, between respective ones of a plurality of subscribers and a computer system over a corresponding first plurality of telephone lines and having the computer system produce and send a plurality of facsimile formatted reports, represented by facsimile formatted signals, over a second plurality of telephone lines, wherein each facsimile formatted report is based upon information requests from a respective subscriber, the method comprising the steps of:

maintaining an electronic data compilation of records;

receiving information request signals from respective ones of said plurality of subscribers over corresponding ones of said first plurality of telephone lines, each subscriber accessing the computer system over a corresponding first telephone line and the received respective information request signals representing an initial data inquiry from said respective subscriber;

substantially concurrently executing, for all subscribers accessing the computer system, the following steps on a per subscriber basis:

electronically formulating a search request command based upon said respective information request signals;

searching said data compilation and obtaining a data set based upon said search request command;

electronically generating and sending audio signals over said corresponding first telephone line reporting a characteristic of said data set to said respective subscriber;

receiving further information request signals over said corresponding first telephone line from said respective subscriber;

formulating a further search request command based upon said further information request signals, obtaining a further data set, and electronically generating and audibly reporting a characteristic of said further data set to said respective subscriber over said corresponding first telephone line;

obtaining a search complete command signal from said respective subscriber over said corresponding first telephone line;

compiling records from said data compilation corresponding to at least one of said data set and said further data set;

formatting said corresponding records into a facsimile formatted report, and generating and transmitting signals representative thereof over one of said second plurality of telephone lines.

3. An interactive data retrieval system for receiving dual tone multifrequency signals as information request signals and a search command over a first telephone line from a subscriber and for transmitting facsimile formatted signals over one of said first telephone line and a second telephone line comprising:

a computer system having:

a telephone interface adapted to receive said information request signals and said search command and to transmit over said first telephone line audio response signals to said subscriber;

a memory having a data compilation of records stored therein, each record having a plurality of fields therein;

a facsimile transmission device adapted to transmit said facsimile formatted signals over one of said first telephone line and said second telephone line;

means for converting said information request signals received from said telephone interface means into a search request command unique to at least one field of said plurality of fields;

means for conducting a search through said at least one field in said data compilation and obtaining a data set based upon said search request command;

means for generating said audio response signals based upon the number of records in said data set and sending the same to the subscriber via the telephone interface;

means, responsive to further information request signals, for converting the same into a further search request command and conducting and compiling a further data set, and means for generating and sending to said subscriber further audio signals based upon the number of records in said further data set;

means responsive to said search command for compiling and formatting records corresponding to at least one of said data set and said further data set into facsimile formatted signals and for sending, via said facsimile transmission device, said facsimile formatted signals.

4. An interactive data retrieval system as claimed in claim 3 wherein said characteristic corresponds to the number of records represented by said data set and said characteristic is audibly generated and sent in response to both information request signals.

5. An interactive data retrieval system as claimed in claim 3 wherein said information request signals are configured as a series of dual tone multifrequency signals and said search command is configured as at least one dual tone multifrequency signal.

6. An interactive data retrieval system as claimed in claim 5 wherein said computer system includes means for generating audio instruction signals and sending said audio instruction signals over said first telephone line via said telephone interface, said audio instruction signals representing instructions describing the usage of the interactive data retrieval system to the subscriber.

7. An interactive data retrieval system for receiving dual tone multifrequency signals as information request signals and search commands over a first plurality of telephone lines from a plurality of subscribers and for transmitting facsimile formatted signals over a second plurality of telephone lines comprising:

a computer system having:

a plurality of a telephone interface, a respective telephone interface coupled to a corresponding one of said first plurality of telephone lines, each telephone interface adapted to receive respective information request signals and search commands and to transmit over the corresponding first telephone line audio response signals to a respective subscriber;

a memory having a data compilation of records stored therein;

a plurality of facsimile transmission devices, a respective facsimile transmission device coupled to a corresponding one of said second plurality of telephone lines, each facsimile transmission device adapted to transmit said facsimile formatted signals over said corresponding said second telephone line;

means for converting said information request signals received from said respective telephone interface means into a search request command;

means for conducting a search of said data compilation and obtaining a data set based upon said search request command;

means for generating said audio response signals based upon a characteristic of said data set and sending the same to the respective subscriber via the respective telephone interface;

means responsive to further information request signals for converting the same into a further search request command and conducting and compiling a further data set, and means for generating and sending to said respective subscriber further audio signals based upon a characteristic of said further data set;

means responsive to said search command for compiling and formatting records corresponding to at least one of said data set and said further data set into facsimile formatted signals and sending, via said respective facsimile transmission device, said facsimile formatted signals; and, multitasking means for operating said means for converting, means for conducting a search, means for generating said audio response, means responsive to the further information requests, and means responsive to said search command when multiple subscribers access the computer system.

8. An interactive data retrieval system as claimed in claim 7 wherein said multitasking means operates on a per subscriber basis and all operations occur substantially concurrently for said multiple subscribers.

9. An interactive data retrieval system as claimed in claim 8 wherein said multitasking means sequentially operates said means for converting, means for conducting a search, means for generating said audio response, means responsive to the further information requests, and means responsive to said search command on a per subscriber basis while substantially concurrently operating on other subscriber requests.

10. An interactive data retrieval system as claimed in claim 8 wherein said characteristic corresponds to the number of records represented by said data set and said characteristic is audibly generated and sent in response to said information request signals and said further information request signals.

11. An interactive data retrieval system as claimed in claim 7 wherein said information request signals are configured as a series of dual tone multifrequency signals and said search command is configured as at least one dual tone multifrequency signal.

12. An interactive data retrieval system as claimed in claim 7 wherein said computer system includes means for generating audio instruction signals and sending said audio instruction signals over said corresponding first telephone line via said respective telephone interface, said audio instruction signals representing instructions describing the usage of the interactive data retrieval system to the respective subscriber.

13. An interactive data retrieval system as claimed in claim 12 wherein said audio instruction signals include a request to input a subscriber ID, said computer system including an access control which permits electronic access to said computer system only after receipt of an appropriate subscriber ID by said respective subscriber, said appropriate subscriber ID being part of said data compilation.

14. An interactive data retrieval system as claimed in claim 7 wherein said search request signals and said further search request signals include signals formatted in search query language.

15. An interactive data retrieval system as claimed in claim 7 wherein said computer system includes:

a sequentially presented stream of data, said stream of data including a plurality of data tags and a plurality of time critical variable data, each said data tag associated with at least one of said plurality of time critical variable data;

said data compilation of records including at least a group of select data tags; and means for monitoring said stream of data and storing, in said memory, time critical data associated with data tags that are similar to said select data tags.

16. An interactive data retrieval system as claimed in claim 15 wherein said respective subscriber sends data tag select command signals over said corresponding first telephone line and said computer system includes:

means for incorporating a data tag, corresponding to said data tag select command signals, into said group of select data tags that are part of the data compilation; and, means for audibly verifying the data tag, corresponding to the respective data tag select command, to the respective subscriber over the corresponding first telephone line, via said respective telephone interface, prior to incorporating said corresponding data tag into said group of select data tags.

17. An interactive data retrieval system as claimed in claim 16 wherein said stream of data represents financial and commercial information, said data tags represent at least one of call letters for stocks, bonds, commodities, futures, options, interest rate identifiers, composite indexes and government statistics, and said time critical variable data represent at least one of monetary values, level indicators, rates of change and other numerical quantities that change over time and are associated with said data tags at a particular time.

18. An interactive data retrieval system as claimed in claim 7 wherein said computer system may be accessed by a third party other than said plurality of subscribers, said computer system includes means for generating audio instruction signals distinguishing said third party from said respective subscribers and sending said audio instruction signals over said corresponding first telephone line via said respective telephone interface, said distinguishing audio instruction signals representing instructions describing the usage of the interactive data retrieval system vis-a-vis the respective subscriber and third party.

19. An interactive data retrieval system as claimed in claim 18 wherein said third party accesses said computer system in order to add or modify records in said data compilation, the additional and modified records being respectively represented by record input signals sent by said third party over one of said plurality of first telephone lines, said computer system including:
   means for adding and modifying said records of said data compilation stored in said memory in accordance with said record input signals received by one of said plurality of telephone interfaces, coupled to said one of said first plurality of telephone lines.

20. An interactive data retrieval system as claimed in claim 19 wherein said computer system includes:
   means for audibly verifying the record, added or modified by said means for adding and modifying, to the third party over said corresponding first telephone line, via said respective telephone interface.

21. An interactive data retrieval system as claimed in claim 7 wherein said data compilation includes records representing information regarding said plurality of subscribers and information regarding persons seeking employment, the latter information including one or more selected from the group of name, address, telephone number, current employment position, salary range, work experience and job preference.

22. An interactive data retrieval system for receiving dual tone multifrequency signals as information request signals and a search command over a first telephone line from a subscriber and for transmitting facsimile formatted signals over one of said first telephone line and a second telephone line comprising:
   a computer system having:
   a telephone interface adapted to receive said information request signals and said search command and to transmit over said first telephone line audio response signals to said subscriber;
   a memory having a data compilation of records stored therein, each record having a plurality of fields therein;
   a facsimile transmission device adapted to transmit said facsimile formatted signals over one of said first telephone line and said second telephone line;
   means for converting said information request signals received from said telephone interface means into a search request command unique to at least one field of said plurality of fields;
   means for conducting a search through said at least one field in said data compilation and obtaining a data set based upon said search request command;
   means for generating said audio response signals based upon the number of records in said data set and sending the same to the subscriber via the telephone interface;
   means responsive to said search command for compiling and formatting records corresponding to said data set into facsimile formatted signals and sending, via said facsimile transmission device, said facsimile formatted signals.

23. An interactive data retrieval system as claimed in claim 22 wherein said information request signals from said subscriber include, at least in a first instance, search request information including at least a first field identifier and a first search string signals and include, at least in a second instance, search modification signals including one of a second field identifier and a corresponding search string, a second search string corresponding to said first field identifier and a boolean logic command, and wherein in the first instance, the means for converting operates on said search request information signals, the computer system includes means, responsive to said search modification signals, for converting said search modification signals into a further search request command and conducting and compiling a further data set, and means for generating and sending to said subscriber further audio signals based upon the number of records in said further data set, and wherein said means responsive to said search command compiles, formats and sends records corresponding to one of said data set and said further data set to said facsimile transmission device.

24. An interactive data retrieval system as claimed in claim 22 wherein said computer system includes:
   a sequentially presented stream of data, said stream of data including a plurality of data tags and a plurality of time critical variable data, each said data tag associated with at least one of said plurality of time critical variable data;
   said data compilation of records including at least a group of select data tags; and
   means for monitoring said stream of data and storing, in said memory, time critical data associated with data tags that are similar to said select data tags.

25. An interactive data retrieval system as claimed in claim 24 wherein said subscriber sends a subscriber ID over said telephone line to said computer system, said computer system having an access control which permits electronic access to said computer system only after receipt of a subscriber ID which matches a stored subscriber ID, said stored subscriber ID being included in said data compilation.

26. An interactive data retrieval system as claimed in claim 24 wherein said subscriber issues data tag select command signals over said first telephone line and said computer system includes:
   means for incorporating a data tag, corresponding to said data tag select command signals, into said group of select data tags that are part of the data compilation.

27. An interactive data retrieval system as claimed in claim 26 wherein said computer system includes means for audibly verifying the data tag, corresponding to the respective data tag select command signals, to the subscriber over the first telephone line, via said telephone interface, prior to incorporating said corresponding data tag into said group of select data tags.

28. An interactive data retrieval system as claimed in claim 27 wherein said stream of data represents financial and commercial information, said data tags represent at least one of call letters for stocks, bonds, commodities, futures, options, interest rate identifiers, composite indexes and government statistics, and said time critical variable data represent at least one of monetary values, level indicators, rates of change and other numerical quantities that change over time and are associated with said data tags at a particular time.

29. An interactive data retrieval system as claimed in claim 28 wherein said means for compiling and formatting records, corresponding to the data set, formats said records as a spread sheet which is represented by said facsimile formatted signals.

30. An interactive data retrieval and purchasing system for receiving dual tone multifrequency signals as information request signals and order commands over a first plurality of telephone lines from a plurality of customers and for transmitting facsimile formatted signals over a second plurality of telephone lines to a respective plurality of customer facsimile machines comprising:

a computer system having:

a plurality of a telephone interfaces, a respective telephone interface coupled to a corresponding one of said first plurality of telephone lines, each telephone interface adapted to receive respective information request signals and order commands and to transmit over the corresponding first telephone line audio response signals to a respective customer;

a memory having a data compilation of records stored therein;

a plurality of facsimile transmission devices, a respective facsimile transmission device coupled to a corresponding one of said second plurality of telephone lines, each facsimile transmission device adapted to transmit said facsimile formatted signals over said corresponding said second telephone line;

means for converting said information request signals received from said respective telephone interface means into a search request command;

means for conducting a search of said data compilation and obtaining a first data set based upon said search request command;

means for generating said audio response signals based upon a characteristic of said first data set and sending the same to the respective customer via the respective telephone interface;

means responsive to further information request signals for converting the same into a further search request command and conducting and compiling a second data set, and means for generating and sending to said respective customer further audio signals based upon a characteristic of said second data set;

means responsive to said order command for compiling and formatting records corresponding to at least one of said first data set and said second data set into facsimile formatted signals;

means for obtaining a customer facsimile identifier based at least in part on one of said first and second data sets, said customer facsimile identifier representing a customer designated facsimile phone number corresponding to one of said plurality of customer facsimile machines that corresponds to said customer;

means for sending, via said respective facsimile transmission device, said facsimile formatted signals to said one of said customer facsimile machines based upon said customer facsimile identifier; and, multitasking means for operating said means for converting, means for conducting a search, means for generating said audio response, means responsive to the further information requests, means responsive to said search command, means for obtaining and means for sending when multiple subscribers access the computer system.

31. An interactive data retrieval and purchasing system as claimed in claim 30 including mans for generating warehouse order signals based upon said at least one of said first and second data sets after said facsimile formatted signals are sent to said customer.

32. An interactive data retrieval and purchasing system as claimed in claim 30 wherein said first data set includes at least said customer facsimile identifier and a customer account identifier.

* * * * *